No. 856,512. PATENTED JUNE 11, 1907.
J. BOWERS.
WIRE CLAMP.
APPLICATION FILED MAR. 22, 1906.

WITNESSES:
E. A. Pell
Ralph Lancaster

INVENTOR
James Bowers
BY
Wm. H. Canfield
ATTORNEY

UNITED STATES PATENT OFFICE.

JAMES BOWERS, OF CALDWELL, NEW JERSEY.

WIRE-CLAMP.

No. 856,512.  Specification of Letters Patent.  Patented June 11, 1907.

Application filed March 22, 1906. Serial No. 307,366.

*To all whom it may concern:*

Be it known that I, JAMES BOWERS, a citizen of the United States, residing at Caldwell, in the county of Essex and State of New Jersey, have invented certain new and useful Improvements in Wire-Clamps; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to a rope or wire clamp and is designed to provide a device of this kind that will hold a wire of small diameter and grip it very tightly under circumstances where the wire is put under a great strain, and considerable power and friction are necessary to maintain a grip.

The invention is illustrated in the accompanying drawings, in which

Figure 1:
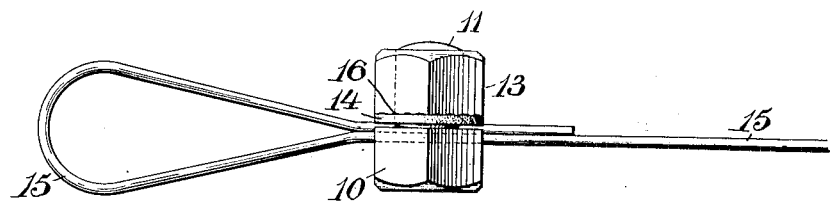
Figure 2:
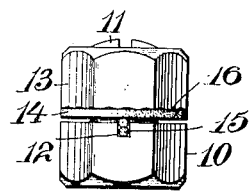
Figure 3:
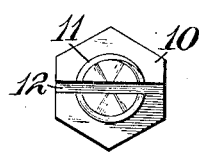
Figure 5:
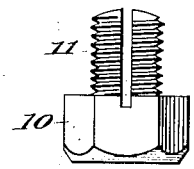
Figure 4:
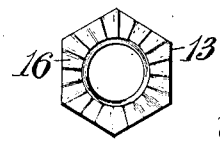

Figure 1 is a side view of the clamp grasping a wire. Fig. 2 is an end view of the clamp with the wire in section. Fig. 3 is a face view of the bolt member of the clamp, and Fig. 4 is a face view of the bottom of the nut member. Fig. 5 is a side view of the screw-threaded bolt.

In making this device, I take a usual bolt 10 with the threaded shank 11, and a groove 12 is cut to divide the shank and extend part way into the head. A nut 13 is screwed down over the shank 11 and does the tightening. A washer 14 is placed underneath the nut 13, this washer being made of a slightly compressible material such as vulcanized fiber or leather or similar material. The function of this washer is to conform itself somewhat, to the projecting surface of the wire 15, which wire projects above the slot in the head of the bolt 10 and thus makes a stronger grip on account of its friction surface, and also on account of its partly surrounding the wire and thereby covering more surface.

The slot in the bolt head is shallower than the depth of article to be held so that the article will project above the face of the bolt head.

The device is shown in Fig. 1 as clamping the ends of a loop, and I have found that where a wire of small diameter was clasped, it has been very difficult to hold the end when the wire has been one made up of twisted strands, the edges of the rotating nut 13, when being tightened, have tended to wear away and sever the strands of the wire. The resilient washer 14 of this construction prevents this tearing of the wire and acts as a protector. The under surface of the nut 13 can be provided with corrugations 16 to engage the face of the washer opposed to the wire and act to seat themselves in the washer. These corrugations are shown as being radially arranged, but I may alter the arrangement of the corrugations.

This clamp is cheap and simple and the gripping will not distort nor grind into the wire or rope to its detriment.

Having thus described my invention, what I claim is:—

1. A wire clamp comprising a bolt member having a head and a screw-threaded shank, the bolt having a slot arranged which splits the shank and extends part way into the head, a nut member having a threaded perforation to fit the shank, of the bolt, and a compressible washer under the nut and adapted to be forced over a wire in the slot of the bolt and be indented thereby to cause a better clamping.

2. A wire clamp comprising a bolt member having a head and a screw threaded shank, the bolt having a slot arranged which splits the shank and extends part way into the head, a nut member having a screw-threaded perforation to fit the shank of the bolt, the face of the nut being corrugated, and a compressible washer arranged between the corrugated face of the nut and a wire in the slot and adapted to be indented by each to cause a locking of the elements in their clamping position.

In testimony that I claim the foregoing, I have hereunto set my hand this 14th day of March 1906.

JAMES BOWERS.

Witnesses:
E. A. PELL,
WM. H. CAMFIELD.